United States Patent [19]

Walker

[11] Patent Number: 4,579,550

[45] Date of Patent: Apr. 1, 1986

[54] CHAINS FOR CONTINUOUSLY VARIABLE CONICAL PULLEY TRANSMISSIONS

[76] Inventor: Roger B. Walker, Rua Paissandu 346, Flamengo, Rio de Janeiro, Brazil

[21] Appl. No.: 563,411

[22] PCT Filed: May 27, 1983

[86] PCT No.: PCT/BR83/00003

§ 371 Date: Nov. 22, 1983

§ 102(e) Date: Nov. 22, 1983

[87] PCT Pub. No.: WO83/04291

PCT Pub. Date: Dec. 8, 1983

[30] Foreign Application Priority Data

May 27, 1982 [BR] Brazil .................................. 8203103

[51] Int. Cl.$^4$ .............................................. F16G 1/21
[52] U.S. Cl. ...................................... 474/242; 474/201
[58] Field of Search ........................ 474/201, 242, 244

[56] References Cited

U.S. PATENT DOCUMENTS 2,403,607  7/1946  Ogard .................................. 474/242
4,303,404  12/1981 Moore .................................. 474/242

FOREIGN PATENT DOCUMENTS 2416091  1/1979  France .

Primary Examiner—James A. Leppink
Assistant Examiner—Frank McKenzie
Attorney, Agent, or Firm—Beveridge, DeGrandi & Weilacher

[57] ABSTRACT

There is described a transmission belt for use in a constantly variable power transmission of the type utilizing pulleys of variable effective diameter, the transmission belt comprising a plurality of identical links of substantially trapezoidal form, having pulley-engaging traction surfaces (1, 32) at their non-parallel edges and being formed on each face with a series of aligned tunnel-like loops (3, 4, 30), the two series of loops on each link being complementary so that when two links are superposed, the loops on adjacent faces define a cylindrical cavity in which a pin (11, 14, 21) is receivable to provide a tension-transmitting articulation between the links. The links are also formed with compression-transmitting surfaces (7, 41, 57) on each of their faces, these surfaces abutting when the links are in a linear array. Optionally, the longer of the parallel sides (43) of each link may be adapted to carry a plain tension belt (40) to augment the power transmission capacity of the belt.

There is also described an embodiment in which the tension-transmitting articulation is provided by a flexible web (60) to which links (61) are fixed in abutting relationship.

12 Claims, 19 Drawing Figures

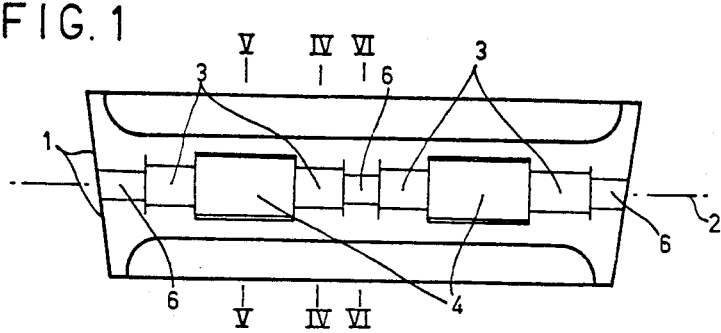
FIG. 1
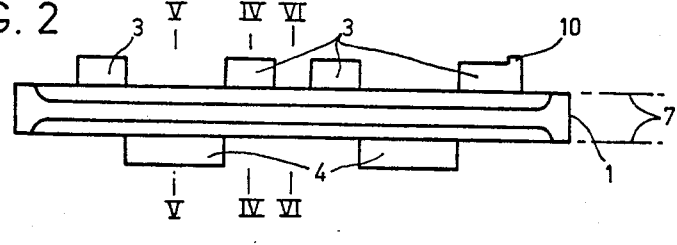
FIG. 2
FIG. 3   FIG. 4   FIG. 5   FIG. 6
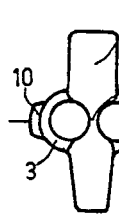 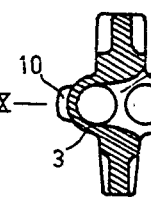 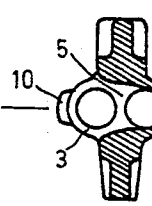 
FIG. 7
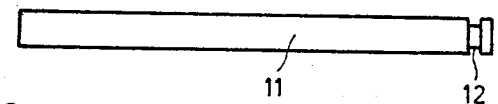
FIG. 8
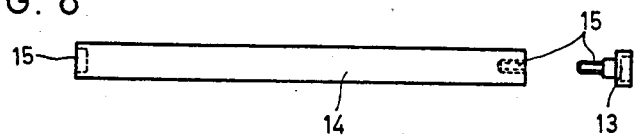

CHAINS FOR CONTINUOUSLY VARIABLE CONICAL PULLEY TRANSMISSIONS

The present invention provides a linked chain of metal or other hard material, for use in continuously variable ratio transmissions (CVT's) which employ conical, or semi-conical, pulleys whose effective diameters are varied during operation.

THE PRESENT STATE OF THE ART

Continuously variable transmissions which employ a pair of conical, or semi-conical pulleys connected by a flexible belt or a chain, which transmit torque by frictional forces between the sides of the pulleys and the belts, and which vary the ratio of transmission by altering the distance between the opposing internal faces of each pulley, have been known for a considerable time. The most common types employ continuous flexible belts of trapezoi dal cross-section. Other common types employ flexible belts which incorporate more rigid elements of trapezoidal cross-section which are able to sustain greater compression forces from the two sides of the pulleys, and hence transmit more torque and power. All such flexible belts are, of course, limited in their performance by the maximum permissible stresses and temperatures of the materials that they employ.

There have been many proposals for chains, made of metal, which can withstand much higher stresses, and also be cooled by oil. However, all such proposals up to now have used chain links which are relatively long, and which would limit performance of any C.V.T. by imposing high concentrations of stress on the relatively few lines of contact between the chain links and the pulley faces, as well as limiting the rotational speed.

A different approach to steel C.V.T. transmission belts has been developed in the several patents and products of the Van Dooren's Transmissei B.V. They employ relatively slim, trapezoidal metal plates which are held together by laminated steel belts, on which the plates can slide freely. These transmission belts differ from prior C.V.T. transmission belts and chains in that they transmit torque by compression between the metal plates, which are held together and pressed up against the pulley sides by the tensioned laminated belts.

The Van Doorne transmission belts have been incorporated into the only continuously variable transmissions which are sufficiently compact, efficient, silent durable, easy to manufacture and economical as to compete with transmissions presently used in automobiles and machine tools. The main reasons for their high performance are the relatively large number of lines of contact between the belts and the pulleys, which reduce stressconcentrations, noise and wear.

One of their main limitations is that, since the trapezoidal compression plates are held pressed together, and are not joined by any positive links, they cannot be made too long because they tend to twist out of line and produce an unstable set of force between the pulley surfaces. This limits the amount of variation is the transmission ratio and also limits the compression forces between the sides of the pulleys.

According to the present invention, a belt for a continuously variable transmission of the type including two pulleys of variable effective diameter, comprises a plurality of links of substantially trapezoidal form, each link having pulley-engaging traction surfaces at its nonparallel edges and being attached in abutting relationship to its adjacent links by tension-transmitting articulations, each link being further provided with a pair of parallel compression surfaces, each of which abuts a compression surface of an adjacent link when the links are joined in a linear array.

DESCRIPTION OF THE PREFERRED EMBODIMENTS

This invention proposes chains of generally planar trapezoidal elements for use in continuously variable transmissions which are oriented in generally parallel planes and are preferably linked together by pins such that:

(a) the links need be no thicker 150% of the link pin diameters, hence they can be relatively short and closely packed, which reduces stress concentration and noise in comparison with other proposed C.V.T. chains;

(b) the bending and shear stresses in the link pins can always be kept within tolerable limits, by increasing the number of retaining loops on each link. Hence thinner pins may be used. There is no compression force on the pins;

(c) the form of the individual links permits them to act as relatively rigid struts, and hence to withstand greater compression faces from the pulley faces. The linkage of the chains tends to maintain the links in planes parallel to the pulley axes. This is an advance on other C.V.T. chains and on the Van Doorne "compression belt"; and (d) this type of chain may also be adapted to carry a laminated tension belt and thus transmit torque by both tension in the belt and compression of the links, simultaneously. This is an advance on all other C.V.T. belts or chains.

Various embodiments of the present invention will now be described with reference to the accompanying drawings, in which:

FIGS. 1, 2 and 3 are side, plan and end views, respectively, of a link of a first embodiment of the invention.

FIGS. 4, 5 and 6 are cross-sections of the line on the planes indicated by lines IV—IV, V—V, and VI—VI, respectively in FIGS. 1 and 2.

FIG. 7 is a view of a link pin. In each chain all the link pins but one are identical and are of this type.

FIG. 8 is a view of a second link pin, which is used to join the ends of a chain into a closed loop.

Figure 18:
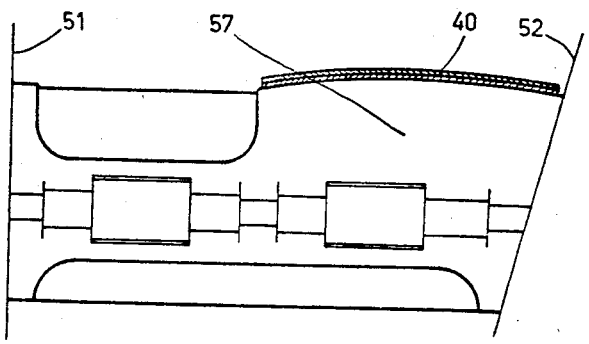
FIG. 18 illustrates an adaptation of this tension/compression chain to run in asymmetrical pulleys which have one face conical and the other planar.

Referring now to the drawings FIGS. 1 to 6 which illustrate, by way of a example, the characteristics of the first version of this belt, most of which are common to the other versions. Each link has two traction surfaces (1) at its ends, which are pressed against the internal faces of the pulleys. The internal faces of the pulleys may have the same cone angles so that the links illustrated in FIG. 1 would be used, or they may differ up to the limit in which one internal face is plane (Ex. FIG. 18). The traction surfaces (1) may be flat or concave to conform to the pulley face, so long as their curvature does not exceed the minimum curvature of the corresponding pulley face.

Each link has a set of loops (3), (4) which project laterally on either side of the links to encircle pins (11, 14) which hold the links together. The number and axial extent of the loops, in relation to the length of each pin, are so determined as to maintain the bending and shear forces on the pins within tolerable limits: the more loops on each link, the lower these forces will be for the same overall compression, traction and tension forces on the link. The space (5) within each loop is dimensioned to accomodate both the pin and the loop of the adjacent link. Between the pins there are webs (6) which serve to reinforce the link.

The maximum thickness of each link is defined, above the axes of the link pins, (as seen on FIG. 6) by the two parallel planes (7), in which lie the axes (2) of the link pins (11, 14) in the assembled chain. Below the axes of the pins the maximum thickness of each link is defined by the two convergent planes (8) in which intersect the planes (7) at the axes of the pins, and which meet in the axis (9) of the pulley when the chain is at its maximum curvature. Within these limits the links may take any form compatible with stress limits, weight, and manufacturing costs. Projections (10), located on the end of one loop of each of the links and extending radially outwardly of that loop serve to retain the pins in position, by engaging suitably positioned circumferential grooves therein.

FIG. 7 illustrates one of the pins (11). It is cylindrical, and has adjacent one end a circumferential groove (12) which receives the projection (10) from the neighbouring link. The groove and projection may alternatively be centrally positioned to simplify assembly.

FIG. 8 illustrates the special link-pin used to close each chain. It has a detachable head (13), and means (15) to fasten it to the body of the pin, in this case a screw thread.

The chain may also incorporate devices to rotate the pins during operation of the chain, which would more evenly distribute wear and thus increase chain life.

Figure 9:
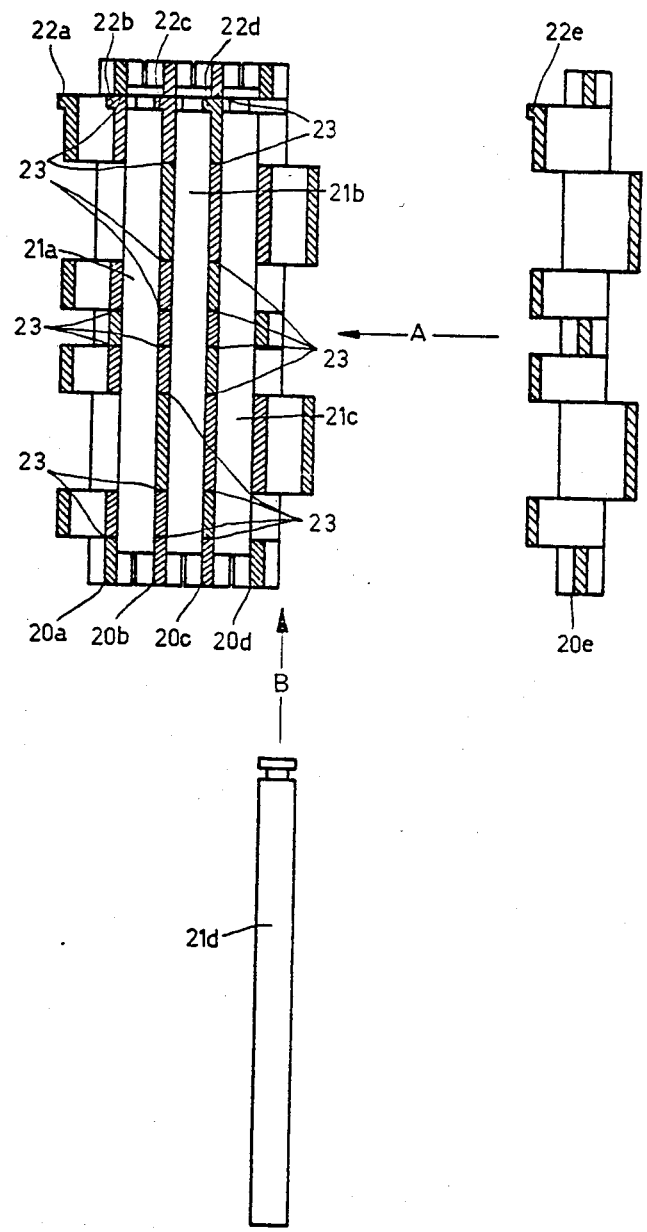
FIG. 9 illustrates the arrangement, and the sequence in which the chain is assembled. There are shown, in cross-section, four links and three pins already assembled; with a fifth link and a fourth pin about to be added to the assembly, in that order.

FIG. 9 illustrates the manner in which the chain is assembled. Four links (20a), (20b), (20c), (20d) are shown already joined by three pins (21a), (21b), (21c). A fifth link (20e) is then offered up to fourth link 20d, in the direction shown by the arrow (A). When it is in place its projection (22c) will enter the groove in pin (21c) and secure it against axial displacement; as project ion (22d) has already locked pin (21b), and projection (22c) pin (21a), respectively. Pin 21d is then assembled by inserting it, in the direction shown by arrow (B), the pin (21d) locks the link (20c) onto the assembled chain by penetrating the interleaved loops 3, 4, of the links 20d, 20c.

There is sufficient clearance between the sides (23) of the loops on each pin to allow the chain to adapt to minor mis-alignments between pulleys without causing undesirable concentrations of stress.

When a sufficient length of chain has been assembled, link 20a is offered up to the link at the opposite end of the chain length. A pin 14 of the type shown in FIG. 7 is then inserted to join the ends, and its head 13 is fastened thereto to prevent axial movement.

Figure 10:
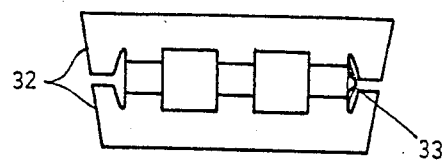
FIGS. 10, 11 and 12 show an alternative embodiment of the chain, suitable for light duty service.
Figure 11:
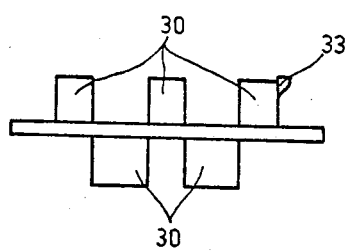
Figure 12:
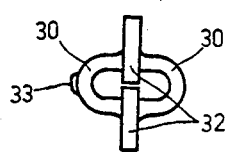

FIGS. 10, 11 and 12 are side view, plan and end view, respectively, of a light-duty version of this chain. The links are joined by pins, in exactly the manner described above. In this embodiment the links of the chain may be stamped out of sheet material, instead of the more costly forging demanded by the other embodiments described herein. The links of this chain have traction surfaces 32 at their ends, loops (30) extending laterally. There are no webs. The pins used are of the same types as are shown in FIGS. 7 and 8, projections 33 cooperating with grooves on the pins to locate them axially.

Figure 13:
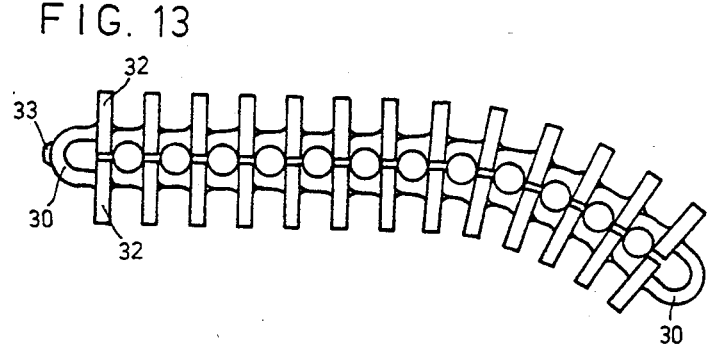
FIG. 13 shows an assembled segment of this alternative embodiment.

FIG. 13 illustrates an assembled length of this chain, in side view.

Figure 14:
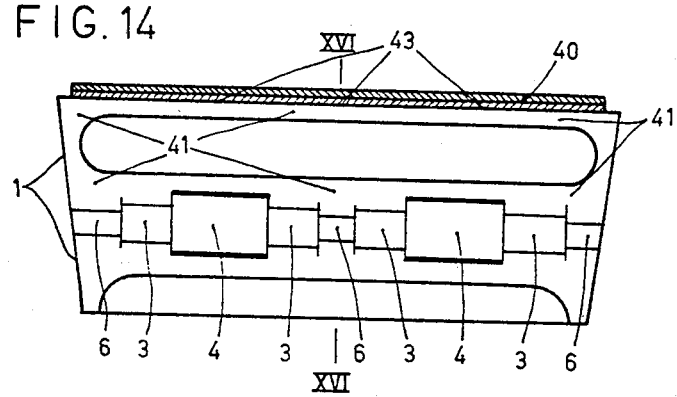
FIG. 14 is a part-sectional side view of a third embodiment of the chain, which incorporates a laminated tension belt.
Figure 15:
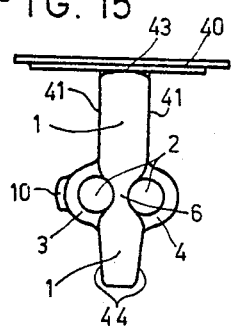
FIG. 15 is an end view.
Figure 16:
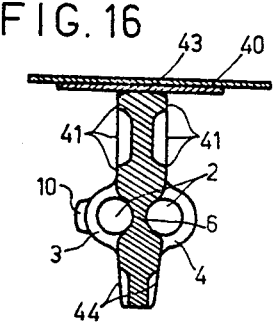
FIG. 16 is a cross-section of the same link and segment of laminated belt as are shown in FIG. 14.

FIGS. 14, 15 and 16 illustrate components of another embodiment of this transmission, which also incorporates a laminated belt (40) which is carried by the chain. The addition of this belt gives the chain the capacity to transmit torque from one pulley to another both by tension in one run of the chain and, simultaneously, by compression in the other.

The traction surfaces (1), link-pins, loops (3), (4), webs (6) and projections in this type of chain are similar to those illustrated in FIGS. 1 to 9, and described above.

One difference lies in the parallel compression surfaces (41), which, in this case, correspond exactly to the two parallel planes that pass through the link-pin axes (2). Another difference is the surfaces (43) which carry the laminated belt (40). The profiles of these surfaces (43) are convexly curved both in side and end elevation. In the elevation shown in FIGS. 15 and 16 the curvature is approximately circular and the arc subtends an angle greater than the maximum angle permitted between adjacent links of the chain; in the elevation shown in FIG. 14 the profile is only curved sufficiently to make the belt ride on the central part of the links, in accordance with established belt and pulley practice.

Figure 17:
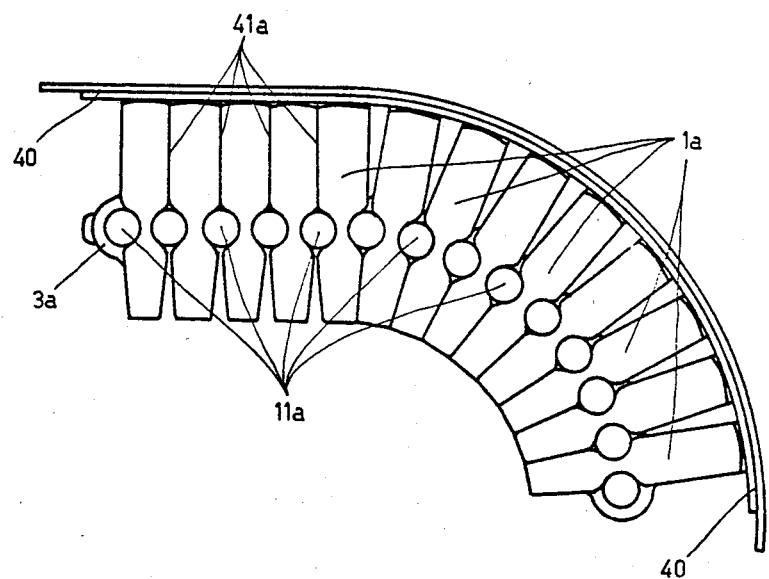
FIG. 17 illustrates a segment of chain compris ing the links and belt of FIGS. 14 to 16.

FIG. 17 illustrates an assembled segment of this type of chain. When mounted on a pair of pulleys the torque is transmitted between the traction surfaces (1a), which grip each internal face of the pulleys, by two distinct mechanisms. On the tension side of the chain torque is transmitted, by tension, between the link loops (3a) and the link-pins (11a). On the compression side of the chain torque is transmitted by compression between the faces (41a) of adjacent links. The laminated belt (40) also participates in the transmission of torque in that the difference between the belt tensions on either side normally corresponds to the compression forces between links on the compression side of the belt.

FIG. 18 illustrates a traction chain, with laminated tension belt, designed to work on asymmetrical pulleys , which have one internal face (51) substantially flat and the other internal face (52) conical. In such a transmission the laminated belt (40) is located closer to the conical face, so as better to balance the forces acting on each link. For the same reason the compression surfaces (57) on each link are also asummetrically positioned with their centres directly below the centre of the belt (40).

Figure 19:
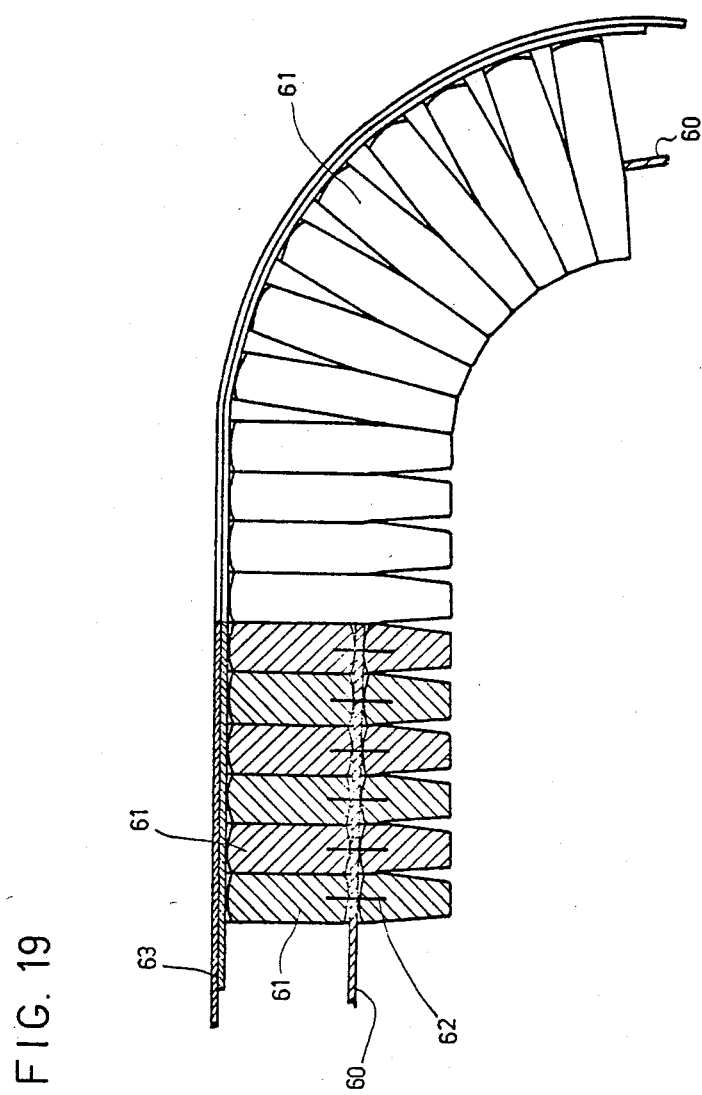
FIG. 19 shows a part-sectional side view of a further embodiment of the chain.

FIG. 19 illustrates an alternative embodiment of the transmission chain in which the links are held together not by pins but by a flexible tension belt 60. Each link 61 is attached to this belt 60, in this case by means of pins 62, so that the links are held tightly against one another. Thus, belt 60 acts in the same way as the pins and loops of the previous embodiments, to provide a tension-transmitting articulation between each adjacent pair of links 61.

The peripheral belt 63 increases the power transmission capacity by increasing the frictional forces between the pulleys and the chain. Belt 63 is pre-tension ed but is not attached to any of the links 61, as in the previous embodiments.

I claim:

1. A transmission belt for a continuously variable power transmission of the type including two pulleys of variable effective diameter, the belt comprising a series of adjacent identical links of substantially trapezoidal form, each link having pulley-engaging traction surfaces on its non-parallel edges and being attached in abutting relationship to its adjacent links by tension-transmitting articulations, each link being further provided with a pair of parallel compression surfaces, each of which abuts a compression surface of an adjacent link when the links are joined in a linear array, wherein the links are joined by means of cylindrical pivot pins extending transversely of the belt, each of the pins being held in two complementary series of loops extending from respective ones of each pair of adjacent links.

2. A transmission belt according to claim 1, wherein one loop of each link has an outwardly extending projection which engages a groove in the pin which secures together its neighbouring two links.

3. A transmission belt according to claim 1 or claim 2, wherein the individual links are forged from metal blanks.

4. A power transmission belt as claimed in claims 1 or 2 wherein the ribs (64 or 76) and sockets (66 or 78) are integrally molded parts of the elastomeric portions (16, 18).

5. A power transmission belt as claimed in claims 1 or 2 wherein the ribs (64 or 76) and sockets (66 or 78) have cylindrical surface portions.

6. A transmission system according to claim 5, wherein the pulleys are asymmetrical, having one conical internal face and one substantially planar internal face, and the traction surfaces of the chain links are correspondingly asymmetrically inclined, and the links of the transmission belt are adapted to carry the plain tension belt adjacent those ends of the links which contact the conical internal faces of the pulleys.

7. A link for a transmission belt, the link being substantially planar and trapezoidal in shape and having pulley-engaging traction surfaces formed on its nonparallel edges, each of its faces being formed with a series of coaxial loops projecting out of the plane of the link, the two series of loops being complementary so that the loops of adjacent faces of two identical links superimposed one upon the other will interleave to define a cylindrical cavity extending parallel to the parallel sides of the links.

8. A link according to claim 7, including a surface along at least a part of its longer parallel edge adapted to engage a plain tension belt.

9. A power transmission belt as claimed in claim 3 wherein the ribs (64 or 76) and sockets (66 or 78) are integrally molded parts of the elastomeric portions (16, 18).

10. A power transmission belt as claimed in claim 3 wherein the ribs (64 or 76) and sockets (66 or 78) have cylindrical surface portions.

11. A power transmission belt as claimed in claim 4 wherein the ribs (64 or 76) and sockets (66 or 78) have cylindrical surface portions.

12. A power transmission belt as claimed in claim 9 wherein the ribs (64 or 76) and sockets (66 or 78) have cylindrical surface portions.

* * * * *